Figure 3:
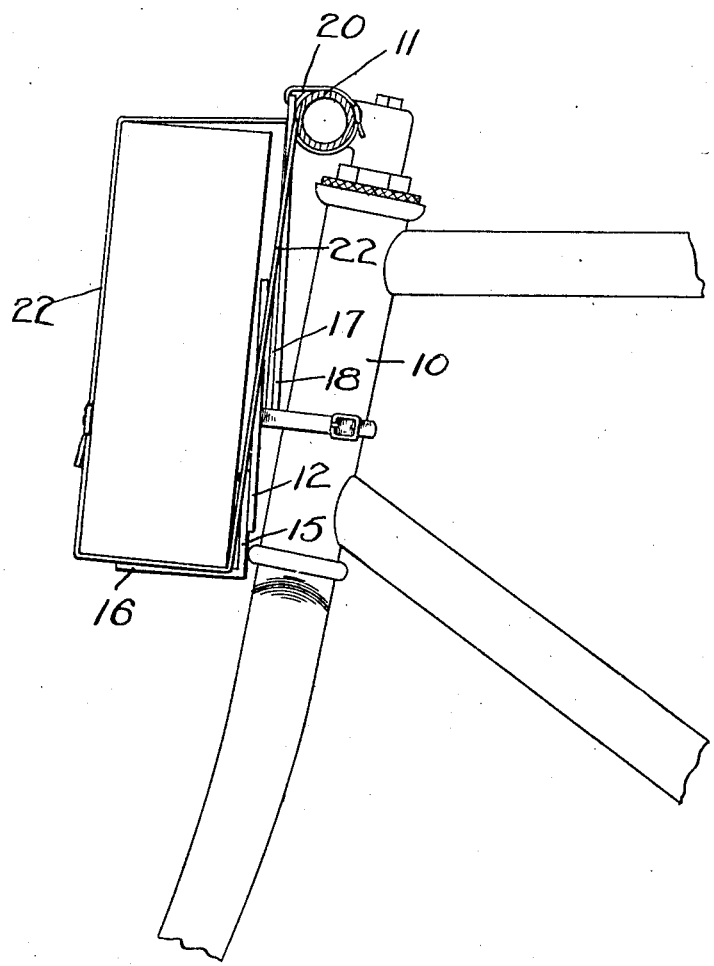

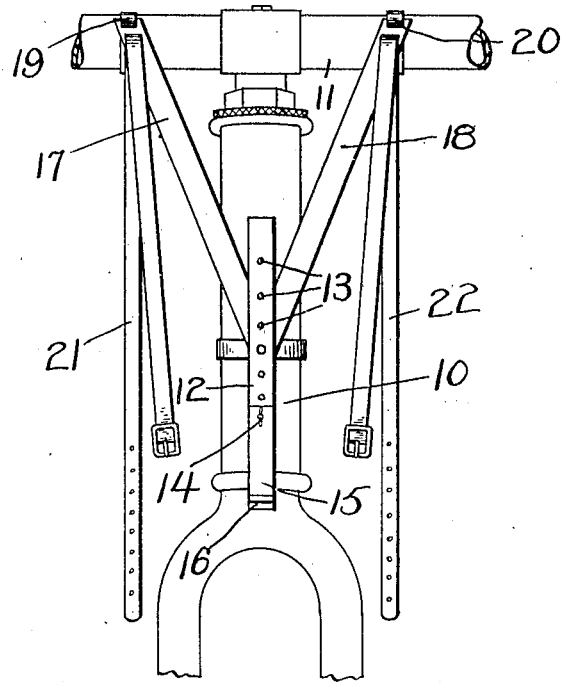
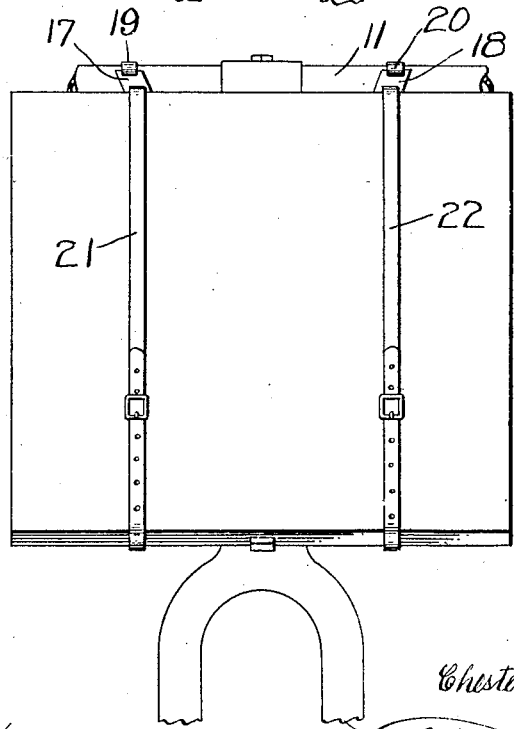

No. 882,346. PATENTED MAR. 17, 1908.
C. W. ROSENCRANCE.
PARCEL CARRIER FOR BICYCLES.
APPLICATION FILED APR. 27, 1907.

2 SHEETS—SHEET 2.

UNITED STATES PATENT OFFICE.

CHESTER W. ROSENCRANCE, OF OACOMA, SOUTH DAKOTA.

PARCEL-CARRIER FOR BICYCLES.

No. 882,346.  Specification of Letters Patent.  Patented March 17, 1908.

Application filed April 27, 1907. Serial No. 370,640.

*To all whom it may concern:*

Be it known that I, CHESTER W. ROSENCRANCE, a citizen of the United States, residing at Oacoma, in the county of Lyman, State of South Dakota, have invented certain new and useful Improvements in Parcel-Carriers for Bicycles; and I do hereby declare the following to be a full, clear, and exact description of the invention, such as will enable others skilled in the art to which it appertains to make and use the same.

This invention relates to parcel-carriers for bicycles.

It is the object of the invention to provide means that may be supported on the head and handle-bars of the bicycle in front of the carrier and be secured thereto so as to support a parcel thereon and also to have it secured thereto to prevent it from falling off.

The nature of the invention is clearly ascertainable from the devices illustrated in the annexed drawings, forming a part of this specification, in view of which it will first be described with respect to its construction and mode of operation, and then be pointed out in the subjoined claims.

Of the said drawings—Figure 1 is a front elevation of the means comprising the invention, showing it as applied to the neck and handle-bars of a bicycle. Fig. 2 is a similar view showing a package as secured thereto upon the carrier attached to the bicycle. Fig. 3 is a side elevation of the same.

Similar numerals of reference designate similar parts or features, as the case may be, wherever they occur.

In the accompanying drawings 10 designates the head, and 11 the handle-bars of a bicycle which may be of the form shown or of any other suited to the purpose.

12 designates the head-bar, consisting of a strip of malleable iron or steel, adapted to fit on the top of the head 10 forward of the rider, and it may extend somewhat beyond or forward of the handle-bars 11. The head-bar is provided with numerous threaded perforations 13 for the reception of the threaded shank of a set-screw, 14, for securing the holding bar 15 thereon in any desired position. The holding-bar 15 has secured to its lower end a stop bar 16 which extends up at a right angle to the said holding bar.

17 and 18 are arm-bars of iron or steel adapted to be pivotally connected at their inner ends and to be pivoted on the head-bar 12 in any of the perforations 13 formed therethrough. The ends of the arm-bars are provided with short straps 19 and 20 by means of which they may be secured to the handle-bars 11 of the bicycle.

In use, the carrier will be placed in position on the head and handle-bars of the bicycle as indicated, and the ends of the arms 17 and 19 will be strapped to the handle-bars as indicated. The parcel to be carried will be laid upon the holding-bar 15 against the stop-bar, and the former bar adjusted in the head-bar in accordance with the size of the parcel or package, and straps 21 and 22 also connected to the arm-bars will be brought around under and carried over the package and buckled so as to confine it in place in order that it may not be liable to slip off or out of position.

By the means described it will be apparent that a parcel or package may be carried on a bicycle with security and without liability of slipping out of place, and without material inconvenience to the rider.

What is claimed is—

1. A parcel carrier for bicycles comprising a head-bar adapted to extend forward from the rider and provided with a carrying device, laterally projecting arms pivoted together at their inner ends and also pivoted on the head-bar, each of said arms being provided on its end with a short strap adapted to secure it to the handle-bar of a bicycle, and a longer strap adapted to encompass a parcel on the carrying device and confine it thereon.

2. A parcel carrier for bicycles comprising a head-bar adapted to extend forward from the rider and provided with a carrying device, comprising a bar adjustable on the head-bar and having a right-angular stop-bar at its lower end, laterally projecting arms pivoted together at their inner ends and also pivoted on the head-bar, each of the said arms being provided on its end with a short strap adapted to secure it to the handle-bar of a bicycle, and a longer strap adapted to encompass a parcel on the carrying device and confine it thereon.

In testimony whereof, I affix my signature, in presence of two witnesses.

CHESTER W. ROSENCRANCE.

Witnesses:
 FERD F. WALTER,
 CARL ANDERSON.